US011249859B2

(12) United States Patent
Liao et al.

(10) Patent No.: US 11,249,859 B2
(45) Date of Patent: Feb. 15, 2022

(54) SYSTEM AND METHOD FOR INTELLIGENT BACKUP SCHEDULING AND MANAGEMENT

(71) Applicant: EMC IP Holding Company LLC, Hopkinton, MA (US)

(72) Inventors: Mengze Liao, Shanghai (CN); Ming Zhang, Shanghai (CN); Karimuthu Rengasamy, Lafayette, CO (US); Yongsheng Guo, Shanghai (CN); Guo Jingjing, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 147 days.

(21) Appl. No.: 16/711,920

(22) Filed: Dec. 12, 2019

(65) Prior Publication Data

US 2021/0182154 A1    Jun. 17, 2021

(51) Int. Cl.
*G06F 11/14* (2006.01)

(52) U.S. Cl.
CPC ...... *G06F 11/1464* (2013.01); *G06F 11/1451* (2013.01); *G06F 11/1461* (2013.01); *G06F 11/1466* (2013.01); *G06F 11/1469* (2013.01)

(58) Field of Classification Search
CPC ............ G06F 11/1464; G06F 11/1461; G06F 11/1451; G06F 11/1469; G06F 11/1466
USPC ......................................................... 711/162
See application file for complete search history.

(56) References Cited

U.S. PATENT DOCUMENTS 9,665,437 B2 *   5/2017   Bhargava ............ G06F 11/1451
2019/0317864 A1 * 10/2019   Ma ...................... G06F 11/1461

* cited by examiner

*Primary Examiner* — Yair Leibovich
(74) *Attorney, Agent, or Firm* — Staniford Tomita LLP

(57) ABSTRACT

A first backup policy specifies triggering backups at a first frequency and retaining the backups for a first duration. A second backup policy specifies triggering backups at a second frequency, less than the first frequency, and retaining the backups for a second duration, greater than the first duration. When two or more backups are to be triggered on a same day, a backup is allowed to proceed according to the first backup policy. A search is conducted for the allowed backup. If the backup is found, the backup is promoted as a backup conducted according to the second backup policy specifying a retention time of the second duration.

20 Claims, 10 Drawing Sheets

SYSTEM AND METHOD FOR INTELLIGENT BACKUP SCHEDULING AND MANAGEMENT

TECHNICAL FIELD

The present invention relates generally to information processing systems, and more particularly to managing scheduled backups to improve efficiency.

BACKGROUND

Many organizations have a backup system to protect against data loss. A backup system functions by storing backup copies of the organization's data. If, for example, a primary copy of data is lost such as via accidental deletion, hardware failure, or other disaster, the data can be recalled from the backup system.

Executing backup jobs, however, consumes computing resources. Further, backups can be disruptive to an organization as operations may need to be paused during a backup in order to maintain consistency. Often, multiple backup jobs will be scheduled that specify different retention times.

Processing multiple backup jobs can severely tax the organization's computing resources in addition to increasing disruption and thus user frustration. These impacts can be compounded when there are a large number of assets to protect. As an example, consider that the organization has 100 virtual machines to be protected by daily, weekly, and monthly backup policies. There will be at least 100 backup jobs each day as a result of the daily backup policy. However, the number of backup jobs will spike to 200 once each week when the daily and weekly backup policies happen to be triggered. The number of backup jobs will spike to 300 once each month when the daily, weekly, and monthly backup policies happen to be triggered.

Therefore, there is a need for improved systems and techniques to intelligently manage and conduct scheduled backups.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
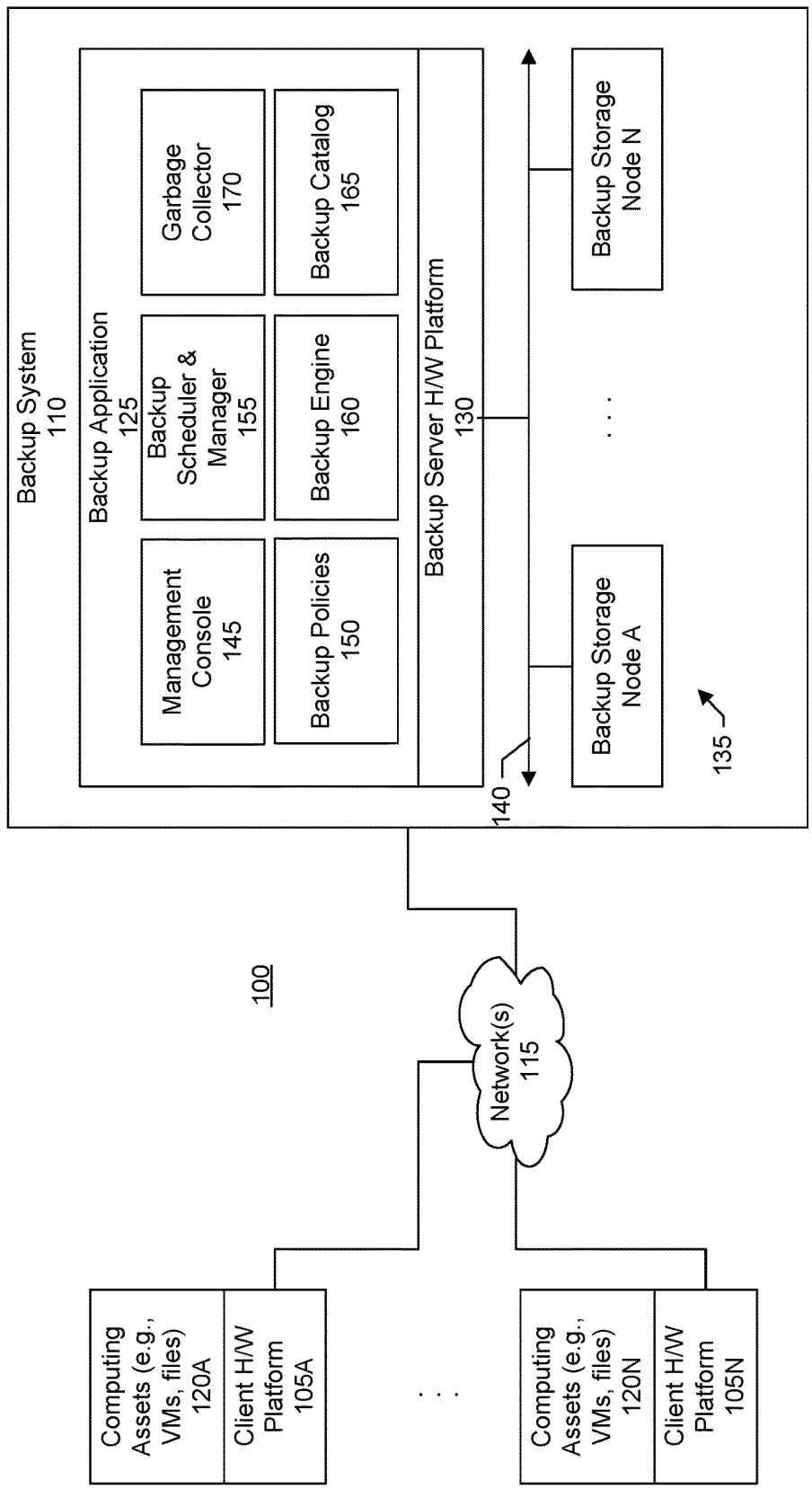
FIG. 1 shows a block diagram of an information processing system for intelligently managing and conducting scheduled backups, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two.

Disclosed herein are methods and systems for efficiently scheduling, conducting, and managing policy-based backups. FIG. 1 shows a block diagram of an information processing system 100 within which such methods and systems may be implemented according to one or more embodiments. In the example shown in FIG. 1, there are a set of clients 105A-N and a backup system 110, connected to the clients via a network 115.

The network provides a mechanism for allowing the various components of the information processing system to communicate with each other. The network may itself be comprised of many interconnected computer systems and communication links. Communication links may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, the network is the Internet, in other embodiments, the network may be any suitable communication network including a local area network (LAN), a wide area network (WAN), a wireless network, an intranet, a private network, a public network, a switched network, and combinations of these, and the like.

The clients may be any type of computing device. Examples of computing devices include personal computers (e.g., desktops, laptops, tablets, smartphones, mobile phones, smartwatches, or wearable devices), servers, Web-enabled devices, or Internet of Things (IoT) devices and appliances. The clients include assets 120A-N to be protected. Such assets may include, for example, virtual machines being hosted by the clients, files or other data objects generated by the clients, applications and databases used by the clients, and so forth.

To protect against data loss, an organization may backup or copy the assets to the backup system. The backup system provides a secondary storage system for the organization's data. An example of a backup system includes Avamar as provided by Dell EMC of Hopkinton, Mass. Some embodiments are described in conjunction with the Avamar backup system. It should be appreciated, however, that aspects and principles of the systems and techniques described can be applied to other backup systems.

Conducting backups consumes resources including compute, storage, and network bandwidth. Backups can be disruptive as users may experience delays in accessing and processing data while a backup is in progress. For example, backing up an asset such as a virtual machine or database may require quiescing the asset, ensuring in-progress writes are completed, generating a snapshot from which to perform the backup, rolling the snapshot over to the backup system, and other operations. These operations require time and consume resources.

Nonetheless, backing up is important because it helps to protect against data loss by allowing an organization to recover from failures and other disasters. Organizations may define a recovery point objective (RPO). An RPO is the organization's desired maximum acceptable amount of data loss it is willing to tolerate. An RPO is measured in time. It is the age of the files or data in backup storage required to resume normal operations if a computer system or network failure or other disaster occurs. For example, if an RPO is set to 30 minutes, then a backup should be conducted every 30 minutes. If an RPO is set to daily, then a backup should be conducted daily.

Users, through a backup system, may configure any number of different backup policies to backup a set of assets. A backup policy may specify a frequency at which backups of the assets are to occur, and a retention duration or time for the backups. The frequency defines a time interval between two consecutive backups. For example, a backup time interval of 24 hours would result in triggering another backup 24 hours after a completion of an initial or previous backup. These backups may be referred to as daily backups. A backup time interval of 7 days would result in triggering another backup 7 days after a completion of a previous backup. These backups may be referred to as weekly backups. A backup time interval of 30 or 31 days would result in triggering another backup 30 or 31 days after a completion of a previous backup. These backups may be referred to as monthly backups. Any interval of time may be specified.

As a further example, a backup policy may specify backing up the assets on a daily-basis and a retention time for the daily backups of 10 days. Another backup policy may specify backing up the assets on a weekly-basis and a retention time for the weekly backups of 3 weeks. Another backup policy may specify backing up the assets on a monthly-basis and a retention time for the monthly backups of 2 months.

There can be a very large number of assets to protect (e.g., thousands of assets needing to be protected). Consider, as an example, that there are over 100 (100+) virtual machine (VM) assets to be protected by daily, weekly, and monthly policies in, for example, a virtual machine environment such as VMWare EXSi, as provided by VMware, Inc. of Palo Alto, Calif. or VMware Cloud (VMC) in an Amazon Web Services (AWS) cloud account. In this example, over 200 (100+*2) VM backup jobs and backups created in a day will happen every week. Over 300 (100+*3) VM backup jobs and backups created in a day will happen every month.

As another example, consider that there are over 10,000 (10,000+) file assets to be protected by daily, weekly, and monthly policies in VMWare EXSi or VMC on AWS. In this example, over 20,000 (10,000+*2) file backup jobs and backups in a day will happen every week. Over 30,000 (10,000+*3) file backup jobs and backups in a day will happen every month.

In other words, in some cases, two or more backups or jobs of the same set of assets may at least partially overlap with each other or fall on the same day or within a relatively short period of time of each other. For example, a time between an end of a backup window for a backup job and a start of another backup window for another backup job may be 0.5, 1, 2, 3, 4, 5, 6, 7, 8, 9, 10, 11, or 12 hours. It is unlikely that there will be much new data between the backups or for the later backup job because of the relatively short period of time between the backup jobs.

In the example above, however, on each weekend, the backup jobs would be double than usual because the daily backup and weekly backup will be triggered. On each beginning or ending of a month, the backup jobs would be triple because the daily, weekly and monthly backup will be triggered. There may be a need for additional hardware and capacity to handle the peak of backup jobs. Adding such additional resources, however, can be inefficient because the additional resources will not be needed most of the time. Duplicated (or near-duplicated) backups may be created on particular days when daily, weekly, and monthly backup policies trigger on the same day (or within relatively short period of time of each other).

There is little or no value for a customer to maintain multiple backup copies created at the "same" granularity of the daily recovery point objective (RPO). A backup engine may include a deduplication module to help reduce the amount of redundant data. Deduplication is a process where a hash, fingerprint, or other signature of a client data object to be backed up is computed. The hash may be compared to a listing of hashes corresponding to other data objects that have already been backed up to the backup system. If there is a match of hashes, the data object does not have to be again backed up. Nonetheless, the deduplication process still consumes compute resources.

Figure 2:
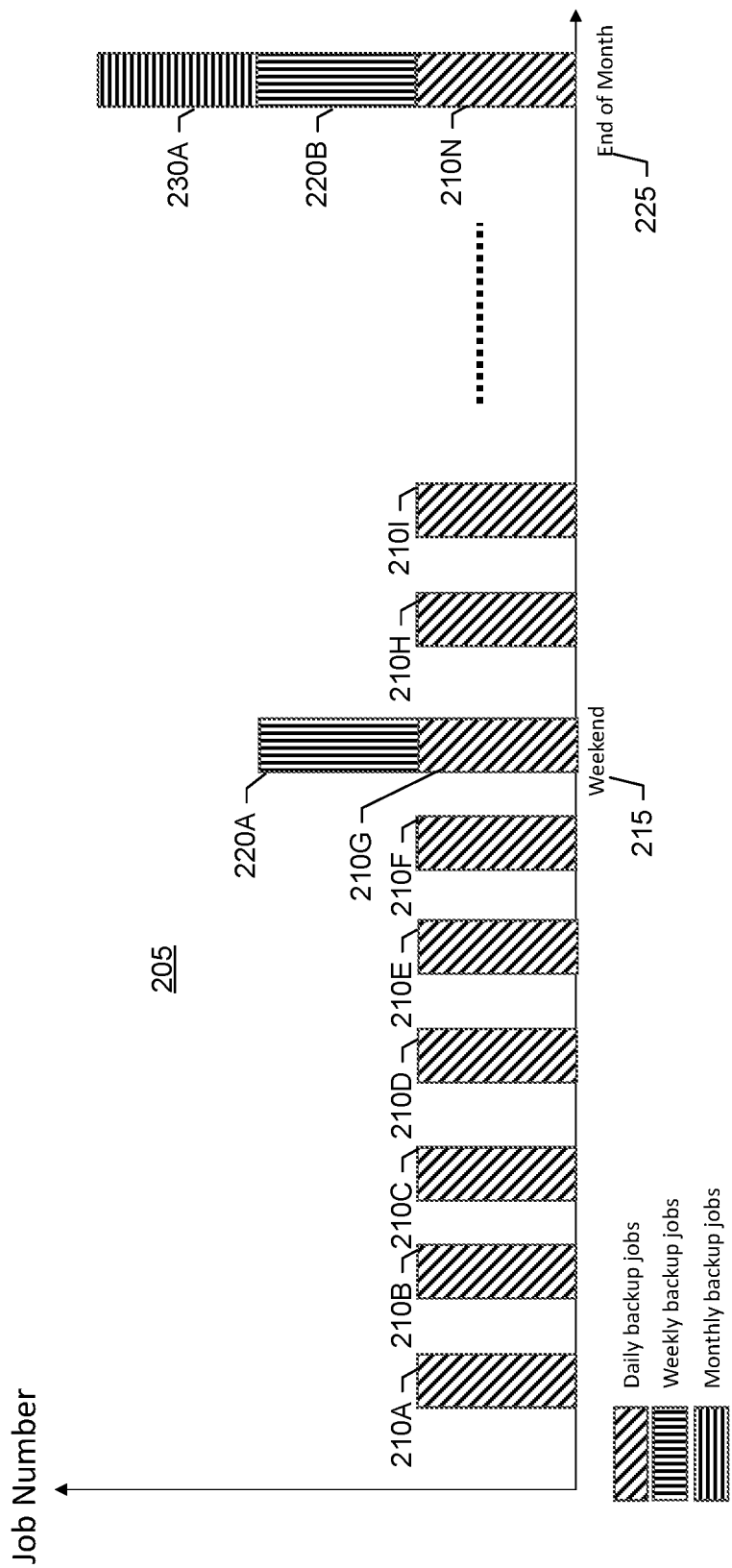
FIG. 2 shows a graph illustrating numbers of backup jobs at particular times, according to one or more embodiments.

More particularly, FIG. 2 shows a graph 205 illustrating the example of the backup jobs in the above scenario where daily, weekly, and monthly backups have been scheduled. An x-axis of the graph indicates time. A y-axis of the graph indicates a backup job number. The example shown in FIG. 2 shows daily, weekly, and monthly backup jobs being conducted over a period of time. Specifically, according to the configured backup policies, each day there are daily backup jobs 210A-N. A weekend 215, however, may further include an additional weekly backup job 220A. Likewise, an end of a month 225 may further include a monthly backup job 230A in addition to daily and weekly backup jobs 210N and 220B, respectively.

In other words, two or more backup jobs may fall on a same particular day. For example, on weekend 215, there are daily and weekly backup jobs 210G and 220A, respectively. At end of month 225, there are daily, weekly, and monthly backup jobs 210N, 220B, and 230A, respectively. The corresponding backup windows for these backup jobs may at least partially overlap with each other or may be relatively close in time to each other. For example, on weekend 215, a backup window for the daily backup job may be from 12:00 PM to 2:00 PM. A backup window for the weekly backup job may be from 3:00 PM to 5:00 PM. A backup window for the monthly backup job may be from 5:00 PM to 7:00 PM. For the weekend, it is unlikely that there will be much new data between the daily and weekly backup jobs because of the relatively short amount of time between these backup jobs. Likewise, for the end of the month, it is unlikely that there will be much new data between the daily, weekly, and monthly backup jobs because of the relatively short amount of time between these backup jobs.

Referring back now to FIG. 1, this system provides an algorithm to manage and conduct policy-scheduled backups that happen to fall on the same day or within relatively short-periods of times of each other. In a specific embodiment, a single backup is allowed to proceed, but other backups are blocked or are not allowed to proceed unless certain conditions are satisfied. In a specific embodiment, the system may adjust a retention duration of a current or previous backup to help ensure proper retention requirements according to the backup policies are met. The system provides flexibility to help users, such as backup administrators, to strike an appropriate balance between backup disruption and protection against data loss and efficient use of computer resources.

In the example shown in FIG. 1, the backup system may be an on-premises backup system of the organization. For example, backups may be stored in network attached storage of the organization. A client may include a client backup module that communicates with the backup system to backup client assets or other data to the backup system. The backup system can store the received data as secondary or backup copies. If the primary copies at the clients become lost, such as via accidental deletion, or client hardware failure, the files can be recovered from the backup system. In some cases, backed up data may be moved from the backup server to cloud storage. Moving backups to cloud storage can lower overall storage costs based on economies of scale that may be available with cloud storage.

The backup system represents any type of server or cluster of servers. In the example shown in FIG. 1, the backup system includes a backup application 125 running on a backup server 130, and one or more backup target storage nodes 135 connected to the backup application via an interconnect 140. The interconnect may include a bus architecture, network, or any other connection scheme that can link backup storage to the backup application. The backup application includes several components including a management console 145, backup policies 150, backup scheduler and manager 155, backup engine 160, backup catalog 165, and garbage collector 170. It should be appreciated that the blocks shown in FIG. 1 may be functional and there can be many different hardware and software configurations to implement the functions described.

The backup storage nodes may include storage devices such as solid state drives (SSDs), hard disk drive (HDDs), tape, or other storage media. Multiple storage devices may be arranged as a storage array. The backup storage nodes may be assigned into different tiers. Different tiers may have different types of storage. For example, recently backed up data may be placed in a first tier having high performance storage devices (e.g., solid state drives (SSDs)) as recently backed up data may be more likely to be accessed as compared to older backups. As backups age or frequency of access decreases, the backups may be transferred from the first tier to a second tier having lower performance, but less expensive storage devices (e.g., hard disk drives (HDDs)).

The backup engine is responsible for communicating and coordinating with the various clients to backup or copy data from the clients to the backup system (and recover the backup data to the clients upon request). In a specific embodiment, one or more other clients or servers may be designated backup proxy nodes. In this specific embodiment, a backup proxy nodes is responsible for backing up data of another client to backup target storage. For example, a backup job may involve generating a volume snapshot of a VM cluster and rolling, by a backup proxy, the volume snapshot to backup target storage. As part of a backup job, metadata about a backup may be created. The metadata may be tagged or associated with the backup so that the backup can be managed, indexed, and searched.

Metadata about a backup may be stored in the backup catalog. For example, once the backup engine has completed the backup, the backup engine may log and record details about the backup in the backup catalog. Metadata about a backup may include a date and time (e.g., timestamp) of the backup, backup source and details (e.g., an identification or listing of the assets or files in the backup or a listing of available backups performed for various clients), retention duration for the backup, expiration date for the backup (e.g., date that the backup is to be removed or deleted from the backup system), type of backup, target storage node or location of the backup, or combinations of these. The user may browse the backup catalog to see a list of the available backups on backup target storage.

The garbage collector is responsible for reclaiming storage space at the backup storage target nodes. For example, as backups age, they may be tagged with metadata or otherwise marked for deletion according to retention times as specified in the backup policies. The garbage collector may run periodic cleaning operations in which the garbage collector reviews metadata associated with various backups to identify which backups have expired and can be deleted.

The backup scheduler and manager is responsible for intelligently scheduling backup jobs for the backup engine and managing the backups including, for example, evaluating the backup policies to determine whether a backup job should be created and issued to the backup engine, creating or not creating the backup jobs (e.g., configuring parameters or settings for a backup job), blocking backup jobs, searching for backups, setting or altering retention durations, and other backup management tasks.

The management console is a user interface to the backup system. The user interface may be a graphical user interface (GUI) or command line (CL) interface. In an embodiment, another application may interface with the backup system through an application programming interface (API) exposed by the backup system. In a specific embodiment, the user (e.g., backup administrator of the organization) uses the management console to define, specify, or configure the backup policies, set a recovery point objective (RPO), define a past time period for searching a backup, and configure other parameters and settings.

A backup policy specifies parameters for a backup. Parameters for the backup may include an identification of assets to be backed up, frequency at which the assets are to be backed up, retention time or duration of the backup, backup window within which the backup is to be performed, type of backup to be performed (e.g., full backup, differential backup, or incremental backup), target storage location for the backup, and other settings or combinations of these.

Figure 3:
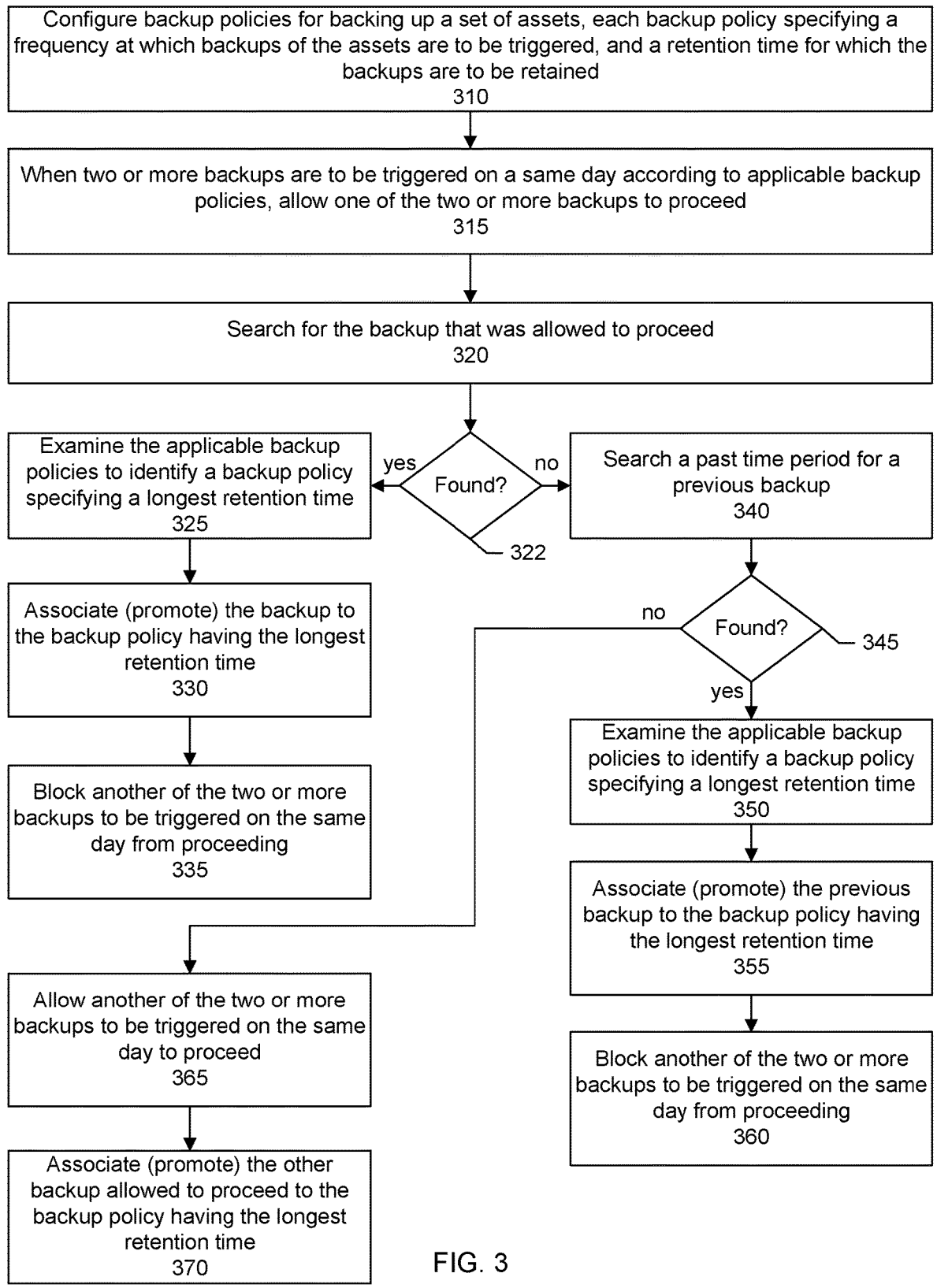
FIG. 3 shows an overall flow diagram for intelligently managing and conducting scheduled backups, according to one or more embodiments.

FIG. 3 shows a flow diagram for an overall operation of the backup system, according to one or more embodiments. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 310, backup policies for backing up a set of assets are configured and stored. Each backup policy may specify a frequency at which backups or backup jobs of the assets are to be triggered and a retention time or duration for which the backups are to be retained. The frequency at which the backups are to be triggered defines a backup time interval between two consecutive backups associated with a particular backup policy. For example, a daily backup policy defines a backup time interval of 24 hours between consecutive backup jobs of the daily backup policy. A weekly backup policy defines a time interval of 7 days between consecutive backup jobs of the weekly backup policy.

In a step 315, when two or more backups or backup jobs of the assets are to be triggered on a same particular day (or within a short period of time of each other) according to their applicable backup policies, one of the two or more backups are allowed to proceed. The backup allowed to proceed may be referred to as an allowed or current backup job. The other of the two or more backups or backup jobs are at least temporarily blocked or not allowed to proceed.

In a step 320, a search is conducted for the backup that was allowed to proceed on that particular day. The search may include examining the backup catalog to identify and locate the backup that was allowed to proceed on that particular day.

In a step 322, a determination is made as to whether or not the backup was found. An inability to find the backup may be the result of the corresponding backup job having failed. There can be many reasons as to why a backup job may have failed to create a backup. For example, there may be a bug or problem with the backup application, software compatibility issues, hardware compatibility issues, snapshot generation problems (e.g., problems with the hypervisor quiescing the virtual machines to be backed up), firewall configurations (e.g., blocked ports), network connectivity issues, and other possible problems.

If, however, the backup job is successful and the backup is found (step 325), the applicable backup policies are examined to identify a backup policy specifying a longest retention time from among the retention times specified in the applicable backup policies.

In a step 330, the backup is associated with or promoted to the backup policy specifying the longest retention time. In other words, the backup may be treated and managed as if the backup was conducted according to the backup policy specifying the longest retention time. This helps to ensure that the backup is not prematurely deleted.

In a step 335, the other of the two or more backups to be triggered on the same particular day are then finally blocked from proceeding. For example, on the particular day both a daily backup job and a weekly backup job may be scheduled according to an applicable daily backup policy and weekly backup policy, respectively. The backup policy associated with the daily backup job may specify a retention time of 10 days. The backup policy associated with the weekly backup job may specify a retention time of 3 weeks. The daily backup job may be allowed to proceed while the weekly backup job is at least temporarily blocked or not allowed to proceed. Upon the daily backup job successfully completing, metadata for the backup job is created associating the backup job with the daily backup policy which indicates a retention time of 10 days.

In this example, however, rather than having the weekly backup job also proceed, the weekly backup job is blocked. The backup associated with the daily backup job is promoted to a weekly backup job. Specifically, metadata may be created to associate the backup with the weekly backup policy so that the backup has a retention time as specified in the weekly backup policy. In a specific embodiment, the promoting or associating may include changing metadata, and specifically a retention time, associated with the backup from 10 days to 3 weeks—e.g., the retention time for weekly backup jobs. Creating (or updating) metadata of a backup is much less resource intensive and disruptive as compared to processing another backup job.

Alternatively, if the backup is not found, in a step 340, an immediate past time period is searched for a most recent previous successful backup of the assets. In a specific embodiment, the past time period corresponds to the recovery point objective (RPO) that the organization has set. In another specific embodiment, the past time period corresponds to a backup time interval as specified in the backup policy corresponding to the other backup job that is to be triggered on the same particular day. When there are two or three or more applicable backup policies, the backup policies may be examined to identify the backup policy having the longest time interval between consecutive backups. In this specific embodiment, the length of the past time period may be set to the longest time interval as specified in the respective backup policy. The past time period may be referred to as a look-back time period. The past time period can be a rolling time period that is measured backwards in time starting with a current or present time.

In a step 345, a determination is made as to whether the most recent previous backup was found within the past time period. If the previous backup is found within the past time period, in a step 350, the applicable backup policies are examined to identify a backup policy specifying a longest retention time from among the retention times specified in the applicable backup policies. In a step 355, the previous backup is associated with or promoted to the backup policy specifying the longest retention time. In other words, the previous backup may be treated and managed as if the backup was conducted according to the backup policy specifying the longest retention time. In a step 360, the others of the two more backups to be triggered on the same particular day are blocked or not allowed to proceed.

Alternatively, if the previous backup is not found, in a step 365, the other of the two or more backups to be triggered on the same particular day is allowed to proceed. In a step 370, the other of the two or more backups allowed to proceed is associated with or promoted to the backup policy having the longest retention time. In other words, the other backup allowed to proceed may be treated and managed as if the backup was conducted according to the backup policy specifying the longest retention time.

The algorithm, process, or technique shown in FIG. 3 provides an efficient use of resources when two or more backup jobs are to be triggered on a same particular day or within a relatively short period of time of each other while also providing various fallback positions in cases of failure. These fallback positions help to ensure that a most recently successful backup is not prematurely deleted and instead retained for a sufficient period of time—regardless of a retention time specified in a backup policy originally associated with the most recently successful backup.

The order within which the fallback positions are triggered can also help to reduce disruption and facilitate efficient use of resources. For example, if the backup or backup job that was allowed to proceed fails (e.g., is not found), it is very likely that any other backup job scheduled to be triggered on that same particular day or within a relatively short period of time will also fail. Since proceeding with a backup job can be disruptive and consume a significant amount of resources, an attempt is made to proceed with the other backup job only as a last resort.

In other words, the other backup job may be blocked or not allowed to proceed unless a set of conditions have been satisfied. A first condition to satisfy may include failing to find a backup created on the current or present day. A second condition to satisfy may include failing to find a previous backup within an immediate past time period.

In a specific embodiment, rather than attempting to proceed with the other backup job, the system searches an immediate past time period for a most recent previous backup. If the previous backup is found within the specific past time period, the backup is promoted to or associated with that backup policy having a longest retention time as specified in the backup policies associated with the backup jobs scheduled to be triggered on the same particular day (or within a relatively short period of time).

Figure 4:
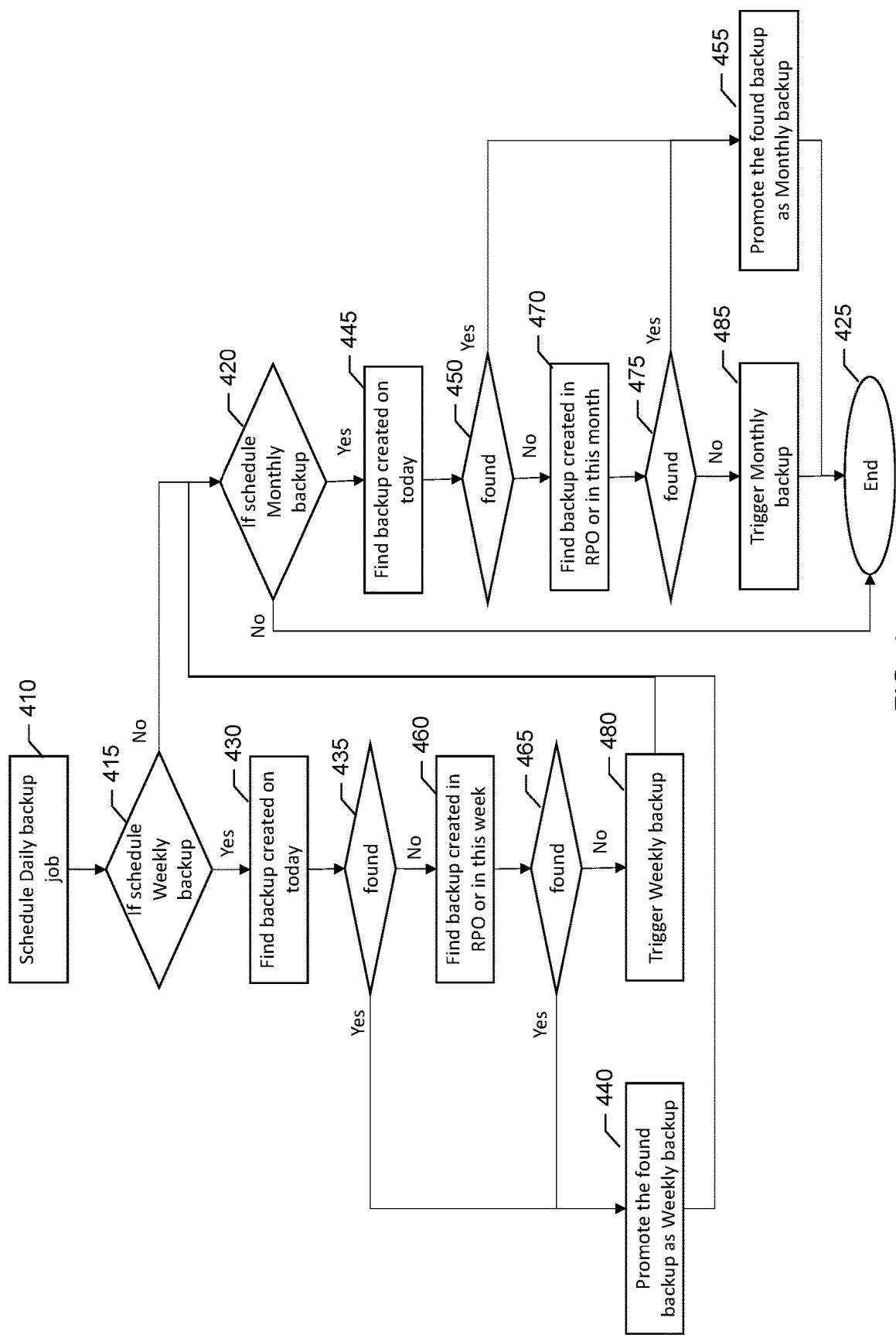
FIG. 4 shows a more detailed flow diagram for intelligently managing and conducting scheduled backups, according to one or more embodiments.

FIG. 4 shows a more detailed flow diagram of an example where backup policies have been configured for daily, weekly, and monthly backups of the assets. Different backup policies may specify different retention times or retention durations. For example, there can be a first backup policy specifying backups of assets at a first frequency (e.g., daily backups) and a first retention time (e.g., 10 days). There can be a second backup policy specifying backups of the assets at a second frequency (e.g., weekly backups), less than the first frequency, and a second retention time (e.g., 3 weeks), greater than the first retention time. There can be a third backup policy specifying backups of the assets at a third frequency (e.g., monthly backups), less than the first and second frequencies, and a third retention time (e.g., 2 months), greater than the first and second retention times.

Table A below provides detail for a specific flow in FIG. 4.

TABLE A

| Step | Description |
| --- | --- |
| 1 | A daily backup job is scheduled and runs independently. |
| 2 | Weekly backup job is scheduled. |
| 2A | If there is a backup created today by the daily backup job, create the metadata which points to the daily backup data. Extend the retention time accordingly (e.g., extend the retention time to that of the weekly backup). |
| 2B | If there is no daily backup created today, look back to a specific time (RPO or whole week) for an available backup. If found, create the metadata which points to the latest backup data. |
| 2C | If there is no available backup. Trigger the new weekly backup. |
| 3 | Monthly backup job is scheduled. |
| 3A | If there is a backup created today by the daily or weekly backup job, create the metadata which points to the backup data. Extend the retention time accordingly (e.g., extend the retention time to that of the monthly backup). |
| 3B | If there is no daily or weekly backup created today, look back to a specific time (RPO or whole month) for available backup. If found, create the metadata which points to the latest backup data. |
| 3C | If there is no available backup. Trigger the new monthly backup. |

Referring now to FIG. 4, in a step 410, on a particular day, a scheduled daily backup job of the assets is allowed to proceed. An examination may be conducted of the backup schedule to determine whether there are any other backup jobs that have been scheduled on that same particular day or within a certain length of time of the initial backup job. The length of the time can be user-configurable. The length of time may range from about 1 hour to about 12 hours. For example, if the length of time is set at 4 hours, a later scheduled backup that is 4 hours or less than 4 hours after an initial backup may be considered to fall on the same day as the initial backup. The length of time may be less than 1 hour or greater than 12 hours.

The system can iterate through an examination of the backup policies to determine whether any other backup jobs are to be triggered on the same particular day. If the particular day does not include other scheduled backup jobs, the process ends. For example, in a step 415, a determination is made as to whether the particular day includes a weekly backup. If the particular day does not include a weekly backup job, a determination is made as to whether the particular day includes a monthly backup job (step 420). If the particular day does not include the monthly backup, the process ends (step 425).

If, however, the particular day includes another backup job to be triggered, such as a weekly backup job, in a step 430, a search is conducted to find the backup (e.g., daily backup) created on the particular day. In a step 435, a determination is made as to whether the backup was found. If the backup was found, in a step 440, the found backup is promoted as a weekly backup. In a specific embodiment, the promotion includes associating a retention time associated with a weekly backup to the found backup. The promotion may include creating or changing metadata or a retention time associated with the found backup to the retention time of the weekly backup.

Figure 5:
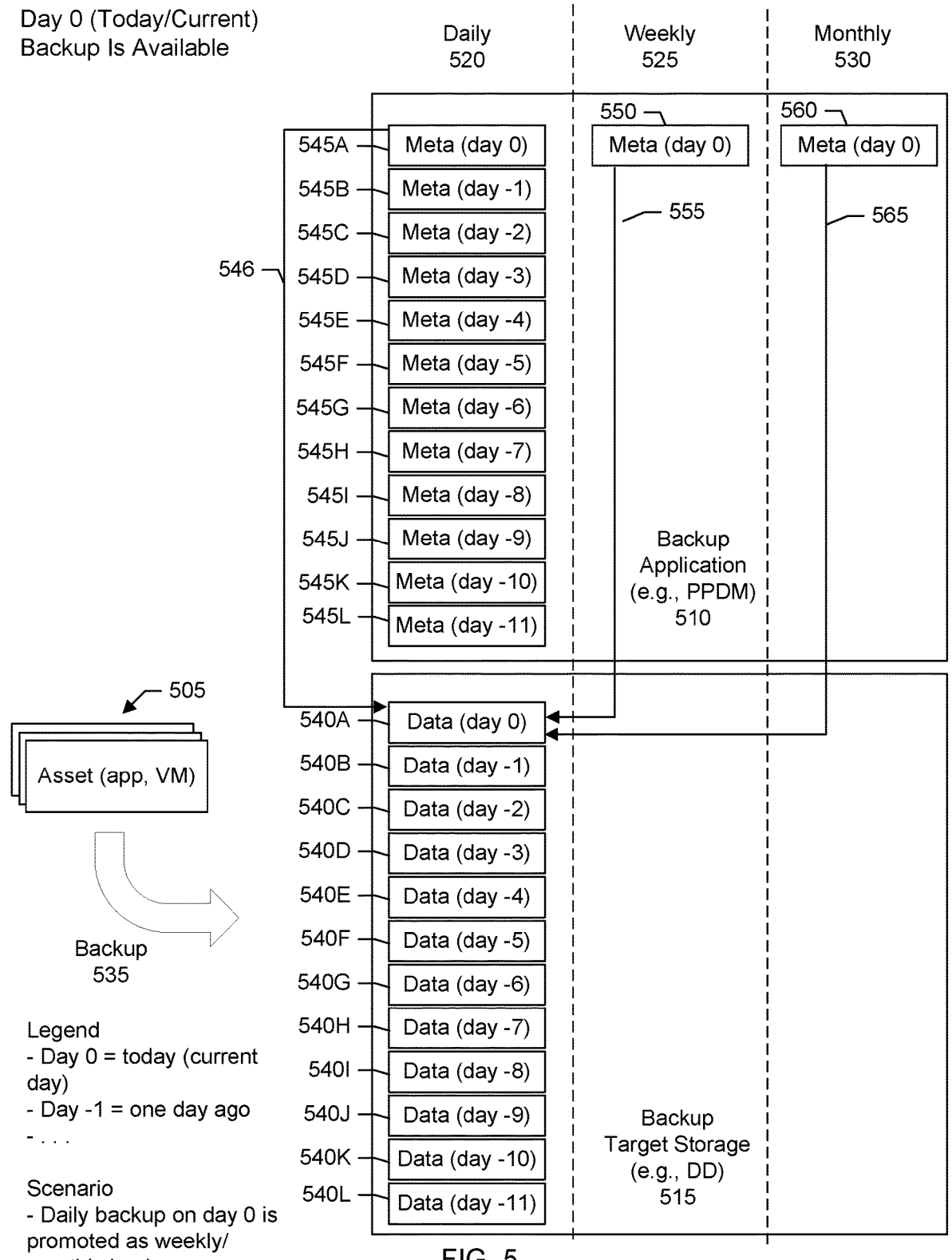
FIG. 5 shows a block diagram of an example where a backup on a current day is available, according to one or more embodiments.

FIG. 5 shows a block diagram in which at a current day 0 (e.g., today) a backup is available. In the example shown in FIG. 5, there are a set of assets 505 (e.g., applications, virtual machines, or other data objects) to be backed up by a backup application (e.g., Dell EMC Power Protect Data Manager (PPDM)) 510 to backup target storage (e.g., Dell EMC Data Domain (DD)) 515. Backup policies have been configured specifying daily backups 520 of the assets, weekly backups 525 of the assets, and monthly backups 530 of the assets.

Daily backups 535 of the assets have been conducted according to the daily backup policy. In particular, FIG. 5, shows the backup target storage storing backup data 540A-L. The backup data includes, for example, data 540A from a daily backup conducted on current day 0, data 540B from a daily backup conducted a day before the current day 0, data 540C from a daily backup conducted two days before the current day 0, data 540D from a daily backup conducted three days before the current day 0, and so forth.

Metadata 545A-L associated with the various sets of backup data is stored by the backup application. The metadata references or points to the various sets of backup data on the backup target storage. For example, metadata 545A created on the current day 0 is associated with and points 546 to corresponding backup data 540A. Metadata 545B created on a day before the current day 0 is associated with and points to corresponding backup data 540B. Metadata 545C created two days before the current day 0 is associated with and points to corresponding backup data 540C. Metadata 545D created three days before the current day 0 is associated with and points to corresponding backup data 540D, and so forth.

On a particular day (e.g., current day 0), a weekly backup job, in addition to the daily backup job, is scheduled to run. A search is conducted for the daily backup created on current day 0 (step 430, FIG. 4). In this example, the daily backup is found and the found backup is promoted as a weekly backup. Specifically, as shown in FIG. 5, metadata 550 is created on the current day and points 555 to the found backup (e.g., backup 540A conducted daily). Metadata 550, however, specifies a retention time for a weekly backup. In other words, a retention time of a daily backup is extended to a retention time of a weekly backup.

Referring back now to FIG. 4, the process continues to a step 420 in which a determination is made as to whether there is a scheduled monthly backup on the same particular day. If the particular day does not include a scheduled monthly backup, the process ends (step 425). If, however, the particular day does include the scheduled monthly backup, in a step 445, a search is conducted to find a backup created on the particular day. In a step 450, a determination is made as to whether the backup was found. If the backup was found, in a step 455, the found backup is promoted as a monthly backup. The promotion may include creating or changing metadata or a retention time associated with the found backup to the retention time of the monthly backup.

For example, referring back now to FIG. 5, metadata 560 is created on the current day and points 565 to the found backup (e.g., backup 540A). As shown in the example of FIG. 5, however, metadata 560 specifies a retention time of the monthly backup. Thus, even though backup 540A may have initially been created as part of a daily backup (with a retention time associated with a daily backup), the retention time of backup 540A is extended to a retention time of a monthly backup.

Referring back now to FIG. 4, consider as an example that in step 435 no backup created on the current day (e.g., day 0) was found. The process advances to a step 460 in which a search is conducted to find a most recent previous backup created within a past time period. In a specific embodiment, the past time period corresponds to an RPO. In another specific embodiment, the past time period corresponds to a next backup time interval (e.g., weekly backup time interval). In a step 465, a determination is made as to whether the previous backup was found. If the previous backup can be found within the past time period, the found previous backup is promoted as a weekly backup (step 440).

Figure 6:
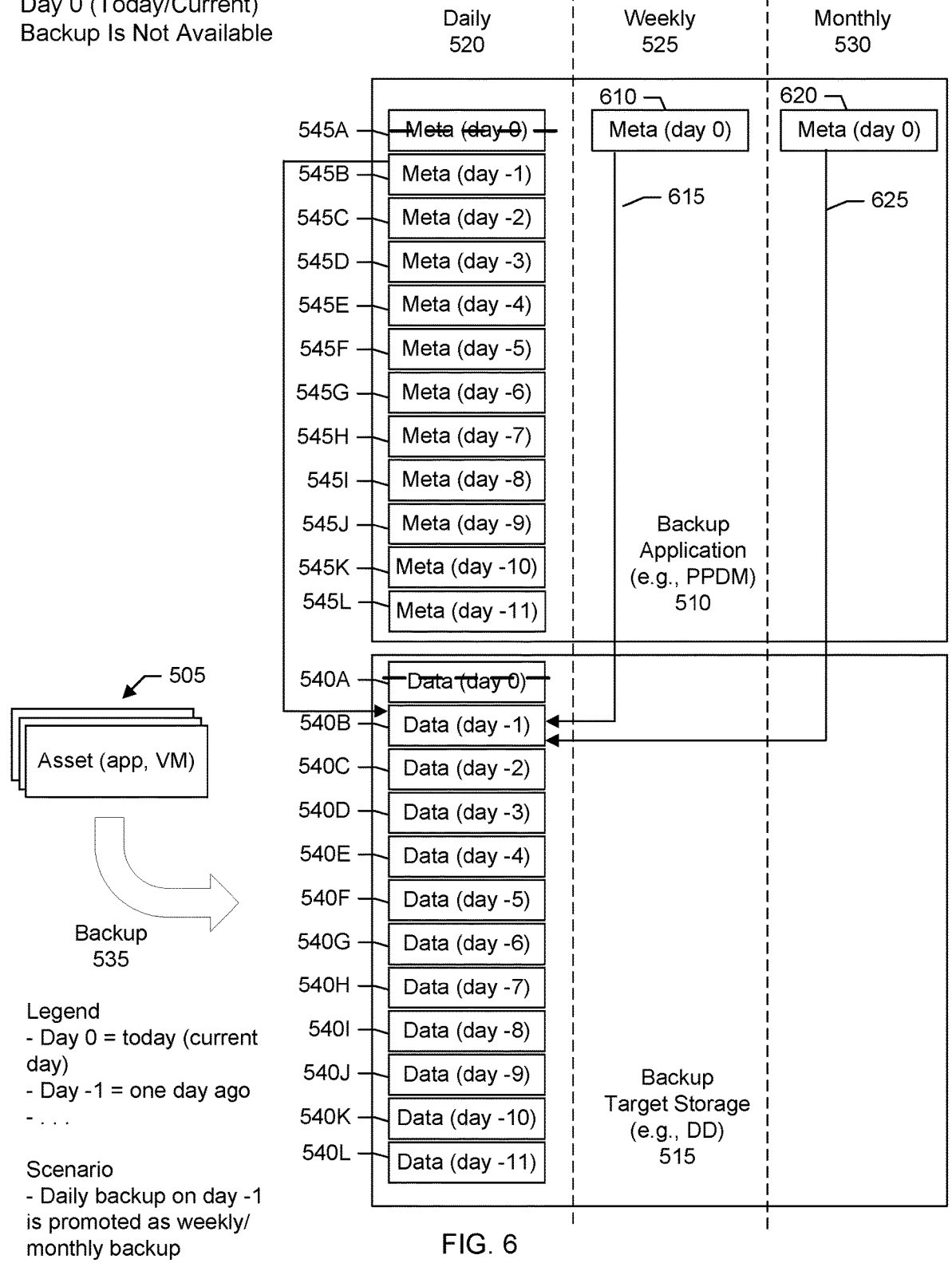
FIG. 6 shows a block diagram of an example where a backup on a current day is not available, according to one or more embodiments.

FIG. 6 shows a block diagram in which at a current day 0 (e.g., today) a backup is not available or cannot be found. FIG. 6 is similar to FIG. 5. In FIG. 6, however, broken strike-through lines have been superimposed over the current day 0 backup (and corresponding day 0 metadata) to indicate that the backup that was to occur today cannot be found. A search of a past time period for a most recent previous backup is conducted (step 460, FIG. 4).

Consider, as an example, that the past time period corresponds to the next backup time interval (e.g., weekly backup time interval or 7 days). In the example shown in FIG. 6, backups 540B, 540C, and 540D have been found within the past time period (e.g., on the preceding first, second, and third days, respectively). The most recent previous backup within the past time period is daily backup 540B that was created one day before the current day 0. Backup 540B is thus promoted as a weekly backup (step 440, FIG. 4). In particular, metadata 610 is created on current day 0. As shown in the example of FIG. 6, metadata 610 points 615 to most recent previous backup 540B and specifies a retention time of a weekly backup.

Referring back now to FIG. 4, consider that in step 450 a backup created on the particular current day cannot be found. The process advances to a step 470, in which a search is conducted over the past time period for the most recent previous backup. In a step 475, a determination is made as to whether the backup can be found within the past time period. If the backup can be found within the past time period, in step 455, the found backup is promoted as a monthly backup.

Referring back now to FIG. 6, the search within the past time period for the most recent previous backup identifies backup 540B (step 475, FIG. 4). Backup 540B is thus promoted as a monthly backup. In particular, metadata 620 is created on current day 0. As shown in the example of FIG. 6, metadata 620 points 625 to most recent previous backup 540B and specifies a retention time of a monthly backup. Thus, backup 540B will be retained for a duration as specified in a monthly backup policy.

Referring back now to FIG. 4, consider, as an example, that in step 465, a previous backup cannot be found within the past time period. The process advances to a step 480 in which the weekly backup is then finally triggered.

As shown in the example of FIG. 4, upon the weekly backup being triggered, the process advances to step 420 to determine whether there is another backup job (e.g., monthly backup) scheduled for the current particular day. If no other backup job is scheduled for the current particular day, the process ends (step 425).

Consider, however, that another backup job (e.g., monthly backup) has been scheduled for the current particular day. The processes advances to step 445 in which a search is conducted for a backup created on the current particular day. In this example, consider that the weekly backup triggered on the current particular day (step 480) was successful and found. In a step 455, the found backup (e.g., weekly backup) is promoted as a monthly backup.

Figure 7:
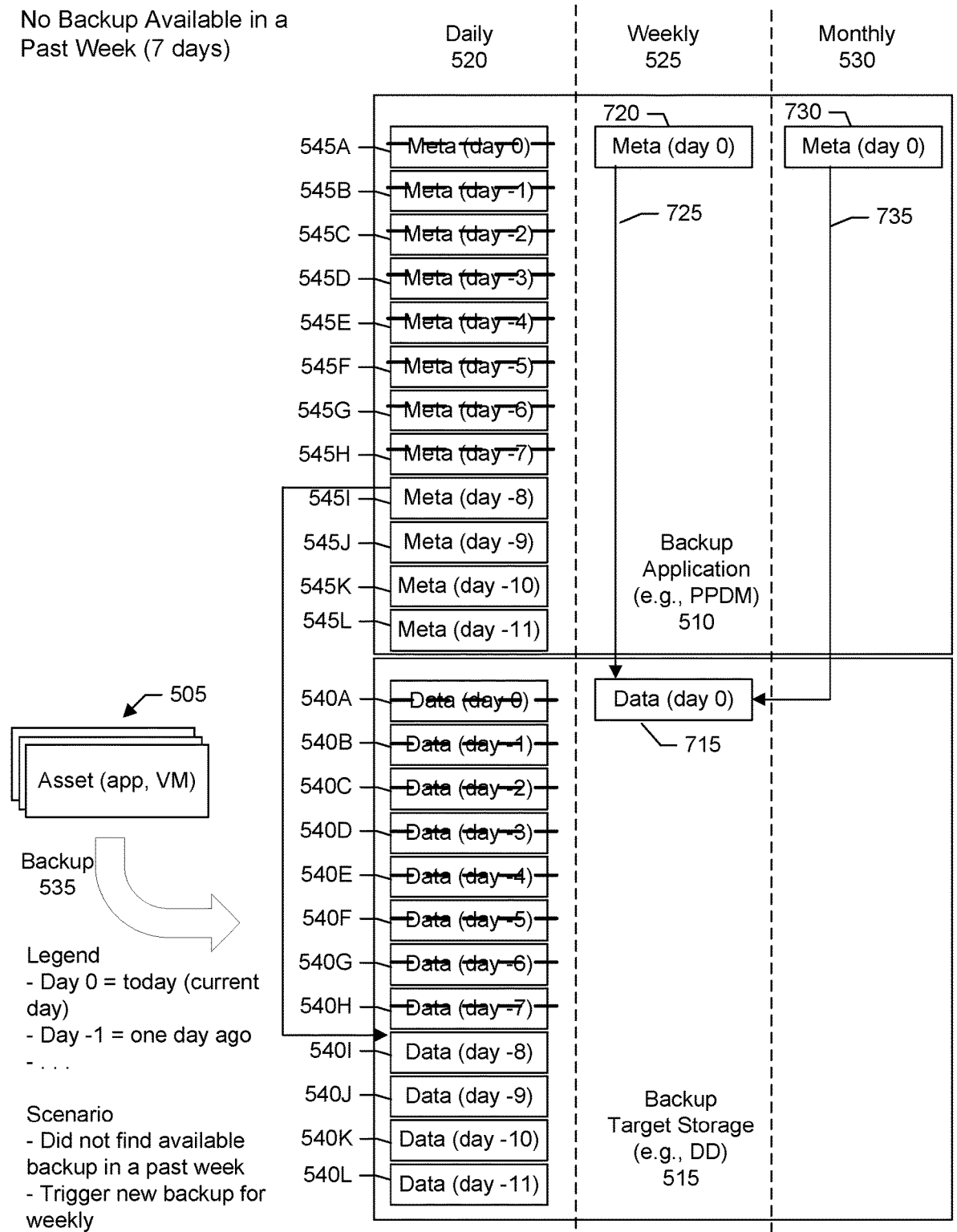
FIG. 7 shows a block diagram of an example where no backups are available within a past week, according to one or more embodiments.

For example, FIG. 7 shows a block diagram in which no daily backup was found on the current particular day or within the past time period (e.g., 7 days prior to current day 0). FIG. 7 is similar to FIG. 5. In FIG. 7, however, broken strike-through lines have been superimposed over the current day 0 daily backup and 7 earlier daily backups (and corresponding metadata) over the 7-day past time period to indicate that these daily backups cannot be found. FIG. 7, however, shows that there was a weekly backup 715 triggered on current day 0 (step 480, FIG. 4) that was successful. Metadata 720 is created on current day 0. Metadata 720 points 725 to weekly backup 715 and specifies a retention time of the weekly backup policy.

FIG. 7, however, further shows that backup 715 has been promoted as a monthly backup (step 455, FIG. 4). Specifically, metadata 730 has been created on current day 0. As shown in the example of FIG. 7, metadata 730 points 735 to backup 715 and specifies a retention time of a monthly backup. Thus, backup 715 will be retained for a duration as specified in a monthly backup policy.

Figure 8:
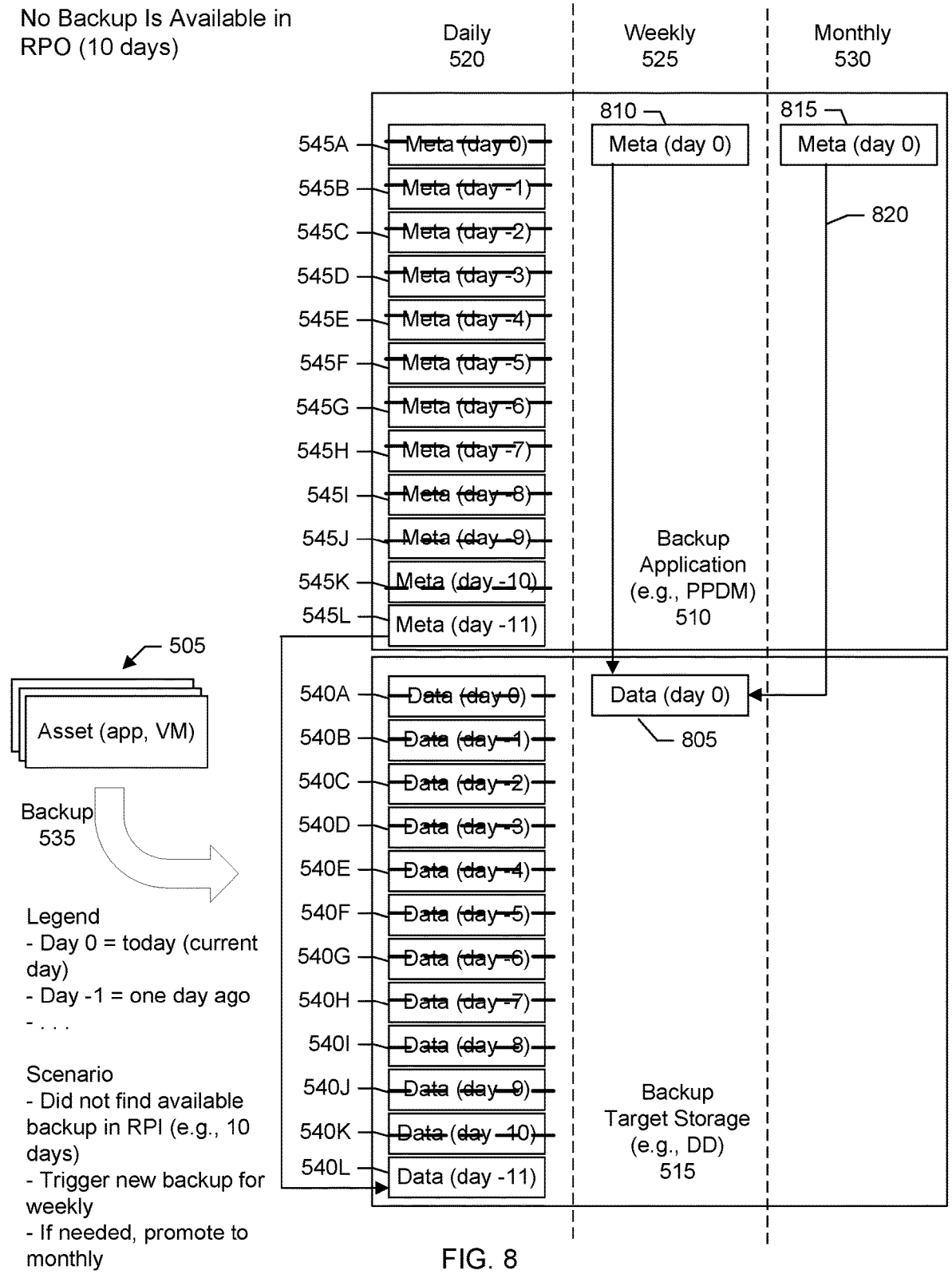
FIG. 8 shows a block diagram of an example where no backups are available within an RPO (e.g., past 10 days), according to one or more embodiments.

FIG. 8 shows a block diagram in which the past time period corresponds to an RPO and the RPO has been set to 10 days. In the example, shown in FIG. 8, no daily backup was found within the past time period (e.g., RPO of 10 days) as indicated by broken strike-through lines. The inability to find a backup within the past time period resulted in a weekly backup 805 having been triggered (step 480, FIG. 4), along with the creation of metadata 810. FIG. 8 further shows backup 805 having been promoted to a monthly backup (step 455. FIG. 4). In particular, metadata 815 is created on current day 0. Metadata 815 points 820 to backup 805 and specifies a retention time of a monthly backup. Thus, backup 805 will be retained for a duration as specified in a monthly backup policy.

Referring back now to FIG. 4, in step 475, if a previous backup cannot be found within the past time period (e.g., RPO or this month), in a step 485, a monthly backup is then finally triggered.

Embodiments allow for saving storage in the protection storage. Consider, as an example, that there are over 100 (100+) VM assets to be protected by daily, weekly, monthly backup policies in VMWare EXSi or VMC on AWS. Rather than there being 100+*2 VM backup jobs and backups created in a day happening every week, the total number of backup jobs may be much less. Rather than there being 100+*3 VM backup jobs and backups created in a day happening every month. The total number of backup jobs may be much less.

As another example, consider that there are over 10,000 (10,000+) file assets to be protected by daily, weekly, and monthly backup policies in VMWare EXSi or VMC on AWS. Rather than there being 10,000+*2 file backup jobs and backups in a day happening every week, the total number of backup jobs may be much less. Rather than there being 10,000+*3 file backup jobs and backups in a day happening every month, the total number of backup jobs may be much less.

The backup fallback positions provided advantages over combining daily, weekly, and monthly backup jobs. Combining the backup jobs can provide a single backup job and backup data. Hardware bandwidth and capacity can be conserved, but if the combined backup job fails, then the effective result is that all three backups will have failed. In contrast, embodiments, provide that in the case of one backup job failing, one or more of the remaining backup jobs can still be triggered to create a successful backup.

The backup fallback positions provide an advantage over simply repeating a daily backup job until it succeeds. For example, if a backup job according to a daily backup policy fails, a repeat in the same backup window of the same day has a very high possibility of also failing. That is, repeating the backup job the same day according to the same backup policy would likely fail. The repeat may simply generate additional jobs and make the customer production situation worse.

In various embodiments, systems and techniques are provided for scheduling daily, weekly, and monthly backup jobs to reduce duplicate backup jobs and backups and save storage space. Systems and techniques are provided for creating metadata to track the retention dates when a backup points to a different backup policy. Systems and techniques are provided for handling the backup failure when reducing duplicated backup jobs from multiple policies in a day or RPO time windows.

More particularly, in a specific embodiment, when a backup on a current day has failed, rather than immediately repeating a backup job on the current day, a search is conducted of a past time period immediately before the current day for a previous backup. The length of the past time period can be a user-configurable value. For example, in a specific embodiment, the length of the past time period may correspond to a pre-defined recovery point objective (RPO) threshold time value. In another specific embodiment, the length of the past time period may correspond to a backup time interval as specified in another backup policy to be triggered the same particular day. If the previous backup can be found within the past time period, a retention time of the previous backup may be updated to a longest retention time as specified in a backup policy. In other words, an expiration or removal date of the previous backup may be extended to a date equal to the current time plus the longest retention time.

As an example, consider that first and second backup jobs are scheduled for a current day according to first and second backup policies, respectively. The first backup policy may specify a first backup time interval between two consecutive backup jobs, and a first retention time. The second backup policy may specify a second backup time interval between two consecutive backup jobs, greater than the first backup time interval, and a second retention time, greater than the first retention time. Table B below provides some sample data.

TABLE B

|  | First Backup Policy | Second Backup Policy |
|---|---|---|
| Backup Time Interval | 24 hours | 7 days |
| Retention Time | 10 days | 3 weeks |

In the example above, the first backup job according to the first backup policy is allowed to proceed on the current day (e.g., Nov. 23, 2019). The second backup job according to the second backup policy is not yet allowed to proceed on the current day. If the first backup job results in a successful backup, metadata is created along with the backup that specifies a retention time of 10 days. Thus, the expiration date of the backup will be Dec. 3, 2019 (e.g., Nov. 23, 2019+10 days=Dec. 3, 2019). However, rather than also proceeding with the second backup job, the backup is promoted as a backup conducted according to the second backup policy which specifies a retention time of 3 weeks. Metadata may be created or (existing metadata modified) that points to the backup and specifies a retention time of the backup to be 3 weeks. Thus, the expiration date of the backup will be extended to Dec. 14, 2019 (e.g., Nov. 23, 2019+3 weeks=Dec. 14, 2019).

If, however, the first backup job fails, rather than repeating the first backup job or triggering the second backup job, a search is conducted over an immediately preceding past time period for a most recent previously successful backup. Assume in this example, that the past time period corresponds to a backup time interval. Thus, in the example, a length of preceding past time period is as specified in the second backup policy or 7 days, e.g., time period beginning Nov. 16, 2019 (e.g., Nov. 23, 2019-7 days=Nov. 16, 2019).

Consider in this example the most recent previous backup starting from the time period beginning Nov. 16, 2019 was a backup conducted on Nov. 20, 2019. The November 20 backup was conducted according to the first backup policy and thus would have a retention time of 10 days and expiration date of Nov. 30, 2019. The November 20 backup, however, will be promoted as a backup conducted according to the second backup policy or, more specifically, be associated with a retention time of the second backup policy or 3 weeks. In a specific embodiment, the expiration date of the November 20 backup is calculated from the current day. In this specific embodiment, the expiration date of the November 20 backup is extended to Dec. 14, 2019 (e.g., Nov. 23, 2019+3 weeks=Dec. 14, 2019).

If, however, the previous backup cannot be found within the past time period, the second backup job is allowed to finally proceed according to the second backup policy.

In a specific embodiment, promoting a backup conducted according to a first backup policy as a backup conducted according to a second backup policy, specifying a retention time greater than the first backup policy may further include moving the backup to a type of storage specified by the second backup policy. For example, the first backup policy may specify that backup jobs conducted according to the first backup policy be stored on a first type of storage. The second backup policy may specify that backup jobs conducted according to the second backup policy be stored on a second type of storage, different from the first type of storage. The different types of storage may offer different performance characteristics, such as hard disk drives versus solid state drives, durability specifications, I/O performance, read speeds, write speeds.

In another specific embodiment, promoting the backup conducted according to the first backup policy as a backup conducted according to the second backup policy may include extending a retention of the backup to a duration as specified in the second backup policy, but maintaining the backup on a type of storage as specified in the first backup policy. For example, it may be the case that the backup represents the most current backup. In that case, it may be desirable to maintain the backup on high performance storage as may be specified in the first backup policy as more recent backups may be more likely to be restored as compared to less recent backups which may be stored on lower performance storage as may be specified in the second backup policy.

Different backup jobs may specify different backup types such as incremental, differential and full. A full backup is a full copy of the entire data set. An incremental backup is a backup of only the data that has changed since the previous backup. An incremental backup can be completed much faster and require less storage than full backups. Incremental backups, however, can be time-consuming to restore as recovery may involve restoring an initial full backup followed by multiple incremental backups. A differential backup is similar to an incremental backup in that it starts with a full backup and subsequent backups only contain data that has changed. The difference in incremental versus differential backup is that, while an incremental backup includes only the data that has changed since the previous backup, a differential backup contains all of the data that has changed since the last full backup. Organizations may employ a combination of different backup types.

In a specific embodiment, the backup management technique shown in FIGS. 3 and 4 can likewise be used to handle such backup jobs. As an example, consider a scenario involving a VM backup. A VM backup may be conducted according to Change Block Tracking (CBT) technology. CBT refers to a technique that transfers only the delta (e.g., changes since a last backup) to the backup target storage system. An example of a backup storage system includes Data Domain (DD), as provided by Dell EMC. In a specific embodiment, the backup target storage system can combine the delta with the previous backup and generate the new full backup. The new full backup may be referred to as a synthetic FULL.

The synthetic FULL can save some bandwidth if the delta is smaller than or below a certain threshold. If not, a regular full backup may require less time as compared to generating a synthetic FULL. In a specific embodiment, both the synthetic FULL and regular FULL may involve quiescing the customer's production VM and application and then generating a run time snapshot of the VMs. The process can have an impact on the customer's production environment. After the snapshot is created, the production VM can continue running as before. The backup proxy can copy the data to DD as a background operation according to synthetic FULL or regular FULL. In a specific embodiment, regardless of whether a backup is a full, incremental, or differential, a search is first conducted to attempt to find the backup and if found and valid, promote the backup. As discussed, in some cases a FULL backup may be more efficient in terms of bandwidth or other computing resources. However, the customer environment impact resulting from quiescing and snapshot operations may be the same across synthetic FULL and regular FULL backups.

Figure 9:
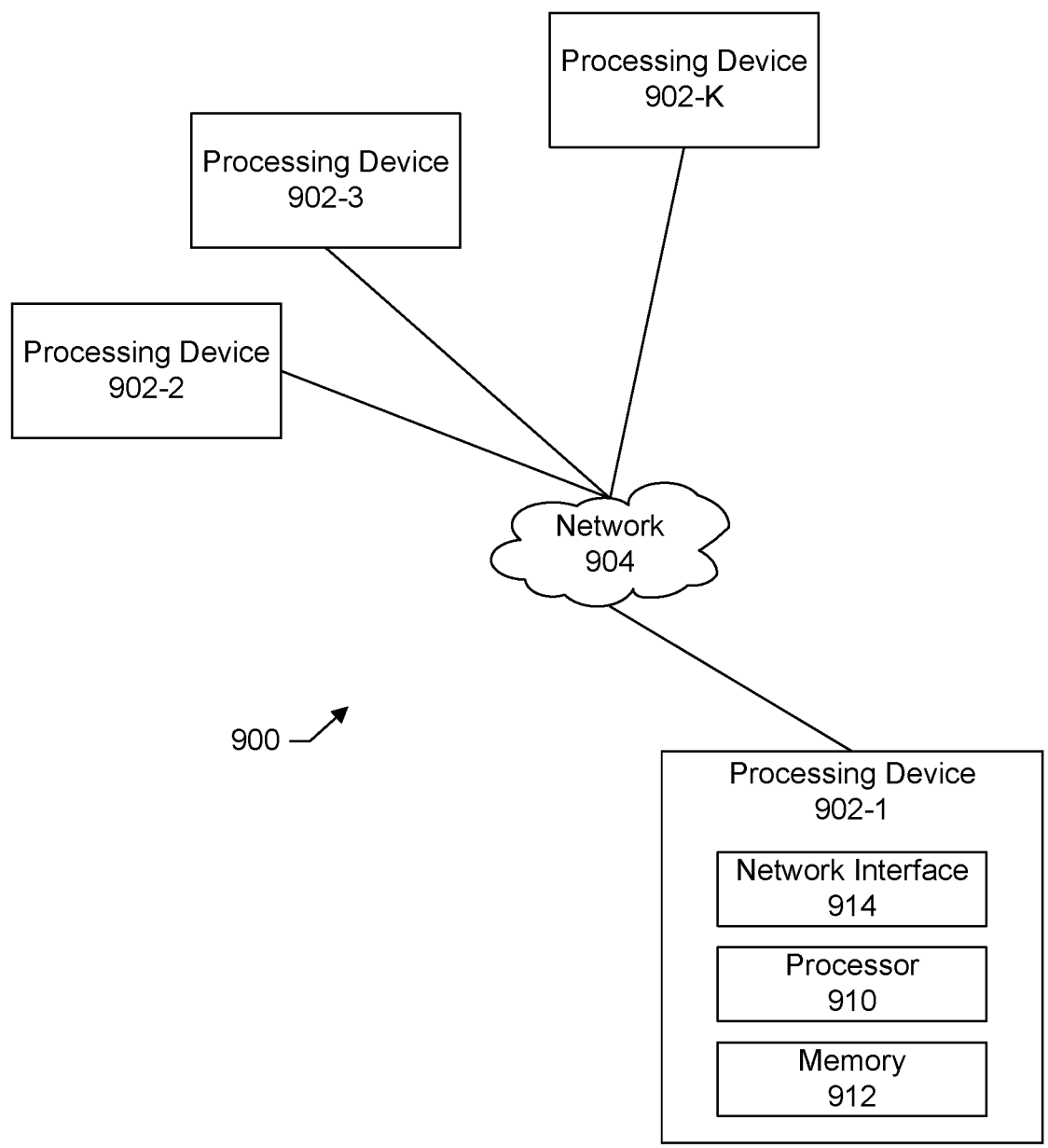
FIG. 9 shows another block diagram of a processing platform that may be utilized to implement at least a portion of an information processing system, according to one or more embodiments.

FIG. 9 shows an example of a processing platform 900. The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 900 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 10:
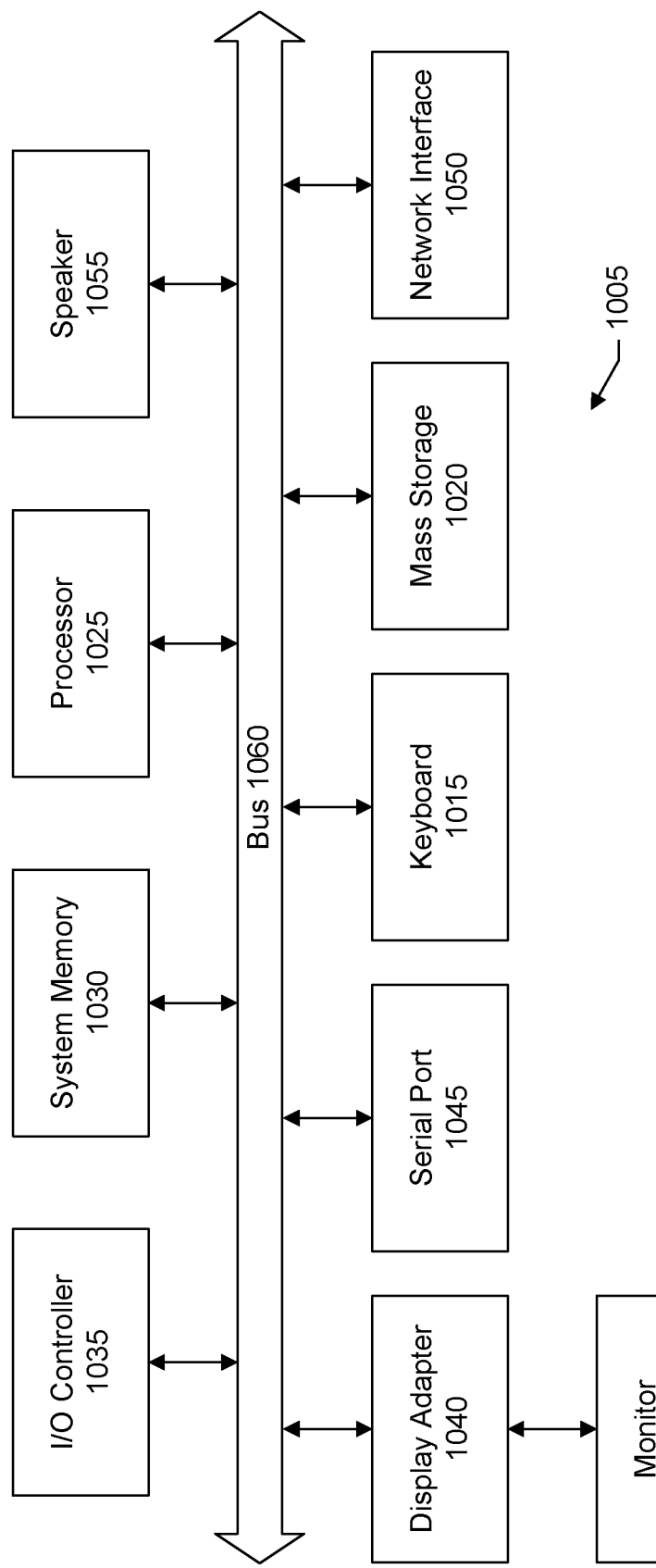
FIG. 10 shows a block diagram of a computer system suitable for use with the information processing system, according to one or more embodiments.

FIG. 10 shows a system block diagram of a computer system 1005 used to execute the software of the present system described herein. The computer system includes a monitor 1007, keyboard 1015, and mass storage devices 1020. Computer system 1005 further includes subsystems such as central processor 1025, system memory 1030, input/output (I/O) controller 1035, display adapter 1040, serial or universal serial bus (USB) port 1045, network interface 1050, and speaker 1055. The system may also be used with computer systems with additional or fewer subsystems. For example, a computer system could include more than one processor 1025 (i.e., a multiprocessor system) or a system may include a cache memory.

Arrows such as 1060 represent the system bus architecture of computer system 1005. However, these arrows are illustrative of any interconnection scheme serving to link the subsystems. For example, speaker 1055 could be connected to the other subsystems through a port or have an internal direct connection to central processor 1025. The processor may include multiple processors or a multicore processor, which may permit parallel processing of information. Computer system 1005 shown in FIG. 10 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, there is a method for managing backing up a plurality of assets comprising: configuring first and second backup policies, the first backup policy specifying triggering backups at a first frequency, and retaining the backups triggered at the first frequency for a first duration, and the second backup policy specifying trigging backups at a second frequency, less than the first frequency, and retaining the backups triggered at the second frequency for a second duration, greater than the first duration; when the backups specified in the first and second backup policies are to be triggered on a same day, allowing a backup to proceed according to the first backup policy; searching for the backup that was allowed to proceed; if the backup that was allowed to proceed is found, promoting the backup as a backup conducted according to the second backup policy specifying a retention of the second duration, and not allowing another backup to proceed on the same day; if the backup that was allowed to proceed is not found, searching a first past time period for a previous backup; and if the previous backup is found within the first past time period, promoting the previous backup as the backup conducted according to the second backup policy specifying the retention of the second duration, and not allowing the other backup to proceed on the same day.

In an embodiment, the method further comprises: if the previous backup is not found within the first past time period, allowing the other backup to proceed on the same day. In an embodiment, the method further comprises: configuring a third backup policy, the third backup policy specifying triggering backups at a third frequency, less than the first and second frequencies, and retaining the backups triggered at the third frequency for a third duration, greater than the first and second durations; determining that the backups specified in the first, second, and third backup policies are to be triggered on the same day; finding the backup that was allowed to proceed according to the first backup policy; and upon finding the backup, promoting the backup as a backup conducted according to the third backup policy specifying a retention of the third duration, and not allowing any other backup to proceed on the same day according to the respective second and third backup policies.

In an embodiment, the method further comprises: configuring a third backup policy, the third backup policy specifying triggering backups at a third frequency, less than the first and second frequencies, and retaining the backups triggered at the third frequency for a third duration, greater than the first and second durations; determining that the backups specified in the first, second, and third backup policies are to be triggered on the same day; not finding the backup that was allowed to proceed on the same day according to the first backup policy; not finding the previous backup within the first past time period; allowing the other backup to proceed on the same day according to the second backup policy; searching for the other backup that was allowed to proceed according to the second backup policy; and if the other backup that was allowed to proceed according to the second backup policy is found, promoting the other backup as a backup conducted according to the third backup policy specifying a retention of the third duration, and not allowing another backup to proceed on the same day according to the third backup policy.

The method may further comprise: if the other backup that was allowed to proceed according to the second backup policy is not found, searching a second past time period for the previous backup, the second past time period having a length greater than the first past time period; and if the previous backup is found within the second past time period, promoting the previous backup as the backup conducted according to the third backup policy specifying the retention of the third duration, and not allowing another backup to proceed on the same day according to the third backup policy.

The method may further comprise: if the previous backup is not found within the second past time period, allowing the other backup to proceed on the same day according to the third backup policy. In an embodiment, a length of the first time period corresponds to one of a pre-defined recovery point objective (RPO) threshold time value or a time interval between two consecutive backups as specified in a backup policy.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method for managing backing up a plurality of assets comprising:
configuring first and second backup policies, the first backup policy specifying triggering backups at a first frequency, and retaining the backups triggered at the first frequency for a first duration, and the second backup policy specifying trigging backups at a second frequency, less than the first frequency, and retaining the backups triggered at the second frequency for a second duration, greater than the first duration;
when the backups specified in the first and second backup policies are to be triggered on a same day,
allowing a backup to proceed according to the first backup policy;
searching for the backup that was allowed to proceed;
if the backup that was allowed to proceed is found, promoting the backup as a backup conducted according to the second backup policy specifying a retention of the second duration, and not allowing another backup to proceed on the same day;
if the backup that was allowed to proceed is not found, searching a first past time period for a previous backup; and
if the previous backup is found within the first past time period, promoting the previous backup as the backup conducted according to the second backup policy specifying the retention of the second duration, and not allowing the other backup to proceed on the same day.

2. The method of claim 1 further comprising:
if the previous backup is not found within the first past time period, allowing the other backup to proceed on the same day.

3. The method of claim 1 further comprising:
configuring a third backup policy, the third backup policy specifying triggering backups at a third frequency, less than the first and second frequencies, and retaining the backups triggered at the third frequency for a third duration, greater than the first and second durations;
determining that the backups specified in the first, second, and third backup policies are to be triggered on the same day; and
upon finding the backup that was allowed to proceed according to the first backup policy, promoting the backup as a backup conducted according to the third backup policy specifying a retention of the third duration, and not allowing any other backup to proceed on the same day according to the respective second and third backup policies.

4. The method of claim 1 further comprising:
configuring a third backup policy, the third backup policy specifying triggering backups at a third frequency, less than the first and second frequencies, and retaining the backups triggered at the third frequency for a third duration, greater than the first and second durations;
determining that the backups specified in the first, second, and third backup policies are to be triggered on the same day;
upon not finding the backup that was allowed to proceed on the same day according to the first backup policy and upon not finding the previous backup within the first past time period, allowing the other backup to proceed on the same day according to the second backup policy;
searching for the other backup that was allowed to proceed according to the second backup policy; and
if the other backup that was allowed to proceed according to the second backup policy is found, promoting the other backup as a backup conducted according to the third backup policy specifying a retention of the third duration, and not allowing another backup to proceed on the same day according to the third backup policy.

5. The method of claim 4 further comprising:
if the other backup that was allowed to proceed according to the second backup policy is not found, searching a second past time period for the previous backup, the second past time period having a length greater than the first past time period; and
if the previous backup is found within the second past time period, promoting the previous backup as the backup conducted according to the third backup policy specifying the retention of the third duration, and not allowing another backup to proceed on the same day according to the third backup policy.

6. The method of claim 5 further comprising:
if the previous backup is not found within the second past time period, allowing the other backup to proceed on the same day according to the third backup policy.

7. The method of claim 1 wherein a length of the first past time period corresponds to one of a pre-defined recovery point objective (RPO) threshold time value or a time interval between two consecutive backups as specified in a backup policy.

8. A system comprising: a processor; and memory configured to store one or more sequences of instructions which, when executed by the processor, cause the processor to carry out the steps of:
configuring first and second backup policies, the first backup policy specifying triggering backups at a first frequency, and retaining the backups triggered at the first frequency for a first duration, and the second backup policy specifying trigging backups at a second frequency, less than the first frequency, and retaining the backups triggered at the second frequency for a second duration, greater than the first duration;
when the backups specified in the first and second backup policies are to be triggered on a same day,
allowing a backup to proceed according to the first backup policy;
searching for the backup that was allowed to proceed;
if the backup that was allowed to proceed is found, promoting the backup as a backup conducted according to the second backup policy specifying a retention of the second duration, and not allowing another backup to proceed on the same day;
if the backup that was allowed to proceed is not found, searching a first past time period for a previous backup; and
if the previous backup is found within the first past time period, promoting the previous backup as the backup conducted according to the second backup policy specifying the retention of the second duration, and not allowing the other backup to proceed on the same day.

9. The system of claim 8 wherein the processor further carries out the steps of:
if the previous backup is not found within the first past time period, allowing the other backup to proceed on the same day.

10. The system of claim 8 wherein the processor further carries out the steps of:
configuring a third backup policy, the third backup policy specifying triggering backups at a third frequency, less than the first and second frequencies, and retaining the backups triggered at the third frequency for a third duration, greater than the first and second durations;
determining that the backups specified in the first, second, and third backup policies are to be triggered on the same day; and
upon finding the backup that was allowed to proceed according to the first backup policy, promoting the backup as a backup conducted according to the third backup policy specifying a retention of the third duration, and not allowing any other backup to proceed on the same day according to the respective second and third backup policies.

11. The system of claim 8 wherein the processor further carries out the steps of:
configuring a third backup policy, the third backup policy specifying triggering backups at a third frequency, less than the first and second frequencies, and retaining the backups triggered at the third frequency for a third duration, greater than the first and second durations;
determining that the backups specified in the first, second, and third backup policies are to be triggered on the same day;

upon not finding the backup that was allowed to proceed on the same day according to the first backup policy and upon not finding the previous backup within the first past time period, allowing the other backup to proceed on the same day according to the second backup policy;

searching for the other backup that was allowed to proceed according to the second backup policy; and if the other backup that was allowed to proceed according to the second backup policy is found, promoting the other backup as a backup conducted according to the third backup policy specifying a retention of the third duration, and not allowing another backup to proceed on the same day according to the third backup policy.

12. The system of claim 11 wherein the processor further carries out the steps of:

if the other backup that was allowed to proceed according to the second backup policy is not found, searching a second past time period for the previous backup, the second past time period having a length greater than the first past time period; and if the previous backup is found within the second past time period, promoting the previous backup as the backup conducted according to the third backup policy specifying the retention of the third duration, and not allowing another backup to proceed on the same day according to the third backup policy.

13. The system of claim 12 wherein the processor further carries out the steps of:

if the previous backup is not found within the second past time period, allowing the other backup to proceed on the same day according to the third backup policy.

14. The system of claim 8 wherein a length of the first past time period corresponds to one of a pre-defined recovery point objective (RPO) threshold time value or a time interval between two consecutive backups as specified in a backup policy.

15. A computer program product, comprising a non-transitory computer-readable medium having a computer-readable program code embodied therein, the computer-readable program code adapted to be executed by one or more processors to implement a method comprising:

configuring first and second backup policies, the first backup policy specifying triggering backups at a first frequency, and retaining the backups triggered at the first frequency for a first duration, and the second backup policy specifying trigging backups at a second frequency, less than the first frequency, and retaining the backups triggered at the second frequency for a second duration, greater than the first duration;

when the backups specified in the first and second backup policies are to be triggered on a same day, allowing a backup to proceed according to the first backup policy;

searching for the backup that was allowed to proceed;

if the backup that was allowed to proceed is found, promoting the backup as a backup conducted according to the second backup policy specifying a retention of the second duration, and not allowing another backup to proceed on the same day;

if the backup that was allowed to proceed is not found, searching a first past time period for a previous backup; and if the previous backup is found within the first past time period, promoting the previous backup as the backup conducted according to the second backup policy specifying the retention of the second duration, and not allowing the other backup to proceed on the same day.

16. The computer program product of claim 15 wherein the method further comprises:

if the previous backup is not found within the first past time period, allowing the other backup to proceed on the same day.

17. The computer program product of claim 15 wherein the method further comprises:

configuring a third backup policy, the third backup policy specifying triggering backups at a third frequency, less than the first and second frequencies, and retaining the backups triggered at the third frequency for a third duration, greater than the first and second durations;

determining that the backups specified in the first, second, and third backup policies are to be triggered on the same day; and upon finding the backup that was allowed to proceed according to the first backup policy, promoting the backup as a backup conducted according to the third backup policy specifying a retention of the third duration, and not allowing any other backup to proceed on the same day according to the respective second and third backup policies.

18. The computer program product of claim 15 wherein the method further comprises:

configuring a third backup policy, the third backup policy specifying triggering backups at a third frequency, less than the first and second frequencies, and retaining the backups triggered at the third frequency for a third duration, greater than the first and second durations;

determining that the backups specified in the first, second, and third backup policies are to be triggered on the same day;

upon not finding the backup that was allowed to proceed on the same day according to the first backup policy and upon not finding the previous backup within the first past time period, allowing the other backup to proceed on the same day according to the second backup policy;

searching for the other backup that was allowed to proceed according to the second backup policy; and if the other backup that was allowed to proceed according to the second backup policy is found, promoting the other backup as a backup conducted according to the third backup policy specifying a retention of the third duration, and not allowing another backup to proceed on the same day according to the third backup policy.

19. The computer program product of claim 18 wherein the method further comprises:

if the other backup that was allowed to proceed according to the second backup policy is not found, searching a second past time period for the previous backup, the second past time period having a length greater than the first past time period; and if the previous backup is found within the second past time period, promoting the previous backup as the backup conducted according to the third backup policy specifying the retention of the third duration, and not allowing another backup to proceed on the same day according to the third backup policy.

20. The computer program product of claim 19 wherein the method further comprises:
if the previous backup is not found within the second past time period, allowing the other backup to proceed on the same day according to the third backup policy.

* * * * *